Patented May 2, 1944

2,347,923

UNITED STATES PATENT OFFICE 2,347,923

VARNISH COMPOSITION

Frank G. Oswald, Wilmington, Del., assignor to Hercules Powder Company, Wilmington, Del., a corporation of Delaware No Drawing. Application June 30, 1942, Serial No. 449,175

18 Claims. (Cl. 260—22)

This invention relates to coating materials and more particularly it relates to coating compositions containing the pentaerythritol or mixed pentaerythritol and polypentaerythritol esters of rosin or modified rosin and a limited amount of an alpha-beta unsaturated polybasic acid.

Heretofore it has been customary to make fast-drying, water-resistant varnishes with oils such as tung oil and oiticica oil. These varnishes owe their desirable characteristics of high viscosity and excellent drying properties to the inherent nature of the oil used rather than to the properties of the resin.

It has been very desirable to make varnishes of this character employing the soft-drying oils such as linseed oil. However, soft-oil varnishes having the desired short-drying time, light color, water and alkali resistance, and kettling properties have not heretofore been attainable. The two principal type resins which, when used with a soft-drying oil, yielded a varnish of sufficiently high viscosity were the phenol-formaldehyde group and the rosin-maleic-glycerol type. Although soft-oil varnishes made with these resins had a sufficiently high viscosity, they failed for other reasons. The phenolic resins tended to turn the varnish dark during the kettling period. Both types of resins gave the varnish a satisfactory viscosity but did not lead to a varnish which dried rapidly to a desirable hard, resistant film. Now in accordance with this invention, it is possible to produce a water- and alkali-resistant, fast-drying varnish in which either some or all of the oil used is of the inexpensive, soft drying type. It has been found that a desirable product will be produced if the resin ingredient used is in the nature of a pentaerythritol or mixed pentaerythritol and polypentaerythritol esters of rosin or modified rosin and a polybasic alpha-beta unsaturated acid. The amount of the polybasic acid used in the varnish preparation is not to exceed an equivalent amount of maleic anhydride which would equal about 9% of the weight of the rosin acid present in the pentaerythritol or polypentaerythritol ester used in the varnish. The particular soft-drying oil or mixture of soft-drying oil with fast-drying oil which is used will depend on the nature of the mixed rosin ester.

Having thus indicated in a general way the nature of this invention, the following examples are given to illustrate more clearly the methods of preparing a varnish in accordance with this invention.

Examples I—VII

Varnishes were prepared by heating together pre-bodied linseed oil and various mixed esters of pentaerythritol with N wood rosin and maleic anhydride. The esters varied in the relative proportion of maleic anhydride and rosin as indicated in the table, the acid groups being in all cases substantially completely esterified. The varnishes were of 25-gallon oil length, e. g. using 25 gallons of linseed oil for each 100 pounds of resin. The oil and resin mixture indicated in each case was heated to 307° C. and held at that temperature for the period of time indicated in the table to form the desired bodied varnish. The varnish was then cooled to 220° C. and thinned to a 50% non-volatile content with mineral spirits.

|  | Example | | | | | | |
|---|---|---|---|---|---|---|---|
|  | I | II | III | IV | V | VI | VII |
| Parts of maleic anhydride per 100 parts N wood rosin | 1 | 2 | 3 | 4 | 5 | 6 | 7 |
| Viscosity of heat-treated linseed oil used (Gardner-Holdt) | (¹) | Z6+ | Z6 | Z4 | Z2 | Z | S |
| Kettling period of varnish at 307° C. in hours | 3 | 3 | 2¾ | 2½ | 2½ | 2½ | 2½ |
| Viscosity of final varnish in 50% non-volatile content in mineral spirits | C | D | E | E | E | E | F |

¹ Jelled.

It is to be observed that as the content of alpha-beta unsaturated dibasic acid is increased, oils of decreasing viscosity are used. Varnishes made as illustrated in these examples dried rapidly to a water- and alkali-resistant film.

Examples VIII–XIII illustrate more fully the preparation of varnishes made with soft-drying oils or with a large proportion of soft-drying oil mixed with tung oil.

Example VIII

One hundred parts of N wood rosin having an acid number of 165 and 3 parts of maleic anhydride were esterified by reacting them at 285° C. for 10 to 15 hours with 12½ parts of commercial pentaerythritol. The resulting resin had an acid number of 15, a melting point of 130° C. and a color of 30 Amber on the Lovibond scale. The resin was used with Z4 body heat-kettled linseed oil to make a 25-gallon varnish.

The varnish was processed as follows:

One hundred pounds of the above resin and 25 gallons of Z4 body linseed oil were heated together. The temperature was brought to 307° C. in 40 minutes and was held there for 2¾ hours. It was cooled to 232° C. and thinned to 50% non-volatile material in mineral spirits. The resulting varnish had a Gardner-Holdt viscosity of F and a Hellige color of 4.

*Example IX*

A varnish was prepared in the same manner as in Example VIII. To this varnish naphthenate driers were added. The amounts of the driers added were such that the amount of metals, based on the oil weight were: 0.2% calcium, 0.2% lead, and 0.07% cobalt.

This varnish dried dust-free in 2½ hours and tack-free in 6½ hours.

*Example X*

In the varnish here described a resin was employed which contained a relatively large amount of maleic anhydride. A low viscosity oil was used therewith. The ingredients used in preparing the resin were:

| | Parts by weight |
|---|---|
| N wood rosin | 100 |
| Maleic anhydride | 6 |
| Pentaerythritol | 15.2 |

These ingredients were esterified at 285° C. until the acid number of the reaction mixture dropped to 15, to produce a resin having a melting point of 150° C. and a color of 35 Amber. The resin thus produced was formulated into a fast-bodying varnish in the following manner:

One hundred pounds of the resin and 25 gallons of a Z3 body heat-treated linseed oil were heated to 307° C. in 40 minutes and were held at this temperature for 2¼ hours. The mixture was allowed to cool to 232° C. and was thinned to 50% non-volatile material with mineral spirits. The resulting varnish had a viscosity of F on the Gardner-Holdt scale and a color of 3 on the Hellige scale.

When the naphthenate driers used in Example IX were added to this varnish, it displayed an exceptional through dry. It dried dust-free in 2 hours and tack-free in 6½ hours. The film produced was extremely water- and alkali-resistant and was flexible.

*Example XI*

This varnish was prepared in the same manner as described in Example VIII. In this case, the pentaerythritol used in Example VIII was replaced with a stoichiometrically equivalent proportion of dipentaerythritol. The resin produced with this ingredient had a melting point of 155° C., an acid number of 15 and a color of 35 Amber (Lovibond scale).

A varnish was produced by taking this resin and kettling it in the same manner as described in Example VIII with a Z2 body heat-treated linseed oil.

*Example XII*

The resin used in this varnish was produced in the following manner. The ingredients used were:

| | Parts |
|---|---|
| Polymerized rosin acid (drop melting point 100° C.) | 100 |
| Maleic anhydride | 4½ |

The ingredients stated were esterified in accordance with the procedure outlined in Example VIII. The resin so produced had a melting point of 156° C., an acid number of 15 and a color of 80 Amber (Lovibond scale).

This resin was made into a varnish as described in Example VIII. The varnish so produced had much the same characteristics as that produced in Example VIII and was used with corresponding results.

*Example XIII*

The varnishes thus far described in the examples have been made with a rosin modified with limited amounts of maleic anhydride and a single soft-drying oil. Excellent varnishes may also be produced by using a mixture of oils. This example illustrates the preparation of a varnish using a mixture of oils. The ingredients herein used were:

| | | |
|---|---|---|
| Resin as prepared in Example VIII | pounds | 100 |
| "U" body dehydrated castor oil | gallons | 15 |
| Tung oil | do | 10 |

The varnish was prepared from these ingredients as follows:

The resin and the dehydrated castor oil were heated to 307° C. in 40 minutes and were held at this temperature for 1 hour. The tung oil was then added and the resulting mixture was heated to 302° C. in 10 minutes. The mixture was held at this temperature for 10 minutes and was then cooled to 232° C. When cooled the mixture was thinned to 50% non-volatile material in mineral spirits. The varnish so produced had a Gardner-Holdt viscosity of E and a color of 2 on the Hellige scale.

Naphthenate driers were added to this varnish so that the metal content, based on the oil weight was 0.3% lead, 0.1% calcium, and 0.07% cobalt. The resulting varnish dried tack-free in 5½ hours and was even more resistant to alkalies and water than was the varnish produced in Example VIII.

Examples I–VII have illustrated the preferred viscosity of the linseed oil to be used with varying amounts of maleic anhydride present in the resin. The overall generalization is that as larger amounts of maleic anhydride are present, the best results in speed of varnish preparation and in varnish properties will be obtained if a lower viscosity oil is used. This general observation has been found to be equally true of all the drying oils.

The use of an oil of such high viscosity as to be incompatible with the acid-modified resin is usually to be avoided. If it is desirable to use an oil of high viscosity with a resin of high maleic content, the incompatibility can be overcome by heating the resin with a small amount of low viscosity oil before adding the high viscosity oil.

Although the varnishes most in demand which are applied by brush are preferably prepared from a prebodied oil, the types of varnishes used in a dipping or spray-gun operation may be made from unbodied oils.

Although Examples I–VII are directed to preparation of 25-gallon oil length varnishes, the same generalizations illustrated therein will also apply to varnishes of other lengths. Thus, in a varnish of any given length, as resins of increasing maleic content are used, oils of decreasing viscosity will best be utilized.

Although the amount of maleic or other acid which is preferably included in producing the resin ester will vary depending on the type of rosin used and on the type of oil used, more than about 9% by weight of the amount of rosin acid present, calculated on the basis of an equivalent amount of maleic anhydride, causes difficulties due to gellation and viscosity instability of the varnish. A quantity between 1% and 5% is preferable.

The esterification process described in the above examples, if desired, may be carried out in a stepwise manner, for example, by contacting the rosin acid and pentaerythritol separately, partially esterifying the pentaerythritol, then adding the alpha-beta unsaturated polybasic acid and completing the esterification. Or, if preferred, the reactions may be carried out all in one operation by reacting all ingredients together at the elevated temperature.

Although the esterification was accomplished in the examples at a temperature of 285° C., it may be carried out at temperatures as low as 250° C. and as high as 350° C. While the rosin, the alpha-beta unsaturated polybasic acid and the pentaerythritol are alone not particularly heat stable, the esters formed from them are extremely so. Hence, in order to form the light-colored resins desired in a varnish, it is desirable initially to contact the rosin, alpha-beta unsaturated polybasic acid, and pentaerythritol at temperatures as far below the final reaction temperature as possible, preferably below about 230° C. The temperature may then be gradually raised and the reaction completed at a temperature above about 250° C. and preferably above 285° C., but preferably below 315° C. to avoid darkening.

If desired, the esterification may be carried out in the presence of suitable esterification catalysts such as boric acid or zinc powder. In such case, lower esterification temperatures are possible. Temperatures as low as 240° C. or lower may be feasible.

Although the kettling process in the examples was carried on at 307° C., it may be successfully accomplished at temperatures within the range of about 250° to about 320° C. depending on the type of oil or oils used in the varnish.

Although the examples given have been confined to preparing varnishes with linseed oil and with a combination of dehydrated castor oil and tung oil, it is to be understood that any of the fast-drying oils such as tung oil and oiticica oil or any of the soft-drying oils such as perilla, poppyseed oil, sunflower oil, soybean oil, and fish oil may also be used. Frequently a combination of two or more of these oils may be used. These oils may be in any form but it is found preferable to prebody the soft-drying oils, as was done in the examples, before employing them in the varnish making procedure. For example, it is preferable to prebody linseed oil to a viscosity of at least U on the Gardner-Holdt scale and even more preferably to Z.

The rosin used in the preparation of the esters may be any of the common rosin acids. It may be a wood rosin or a gum rosin in the crude form or in the form obtained by refining and/or modifying by distillation, by extraction with selective solvents for color bodies, by heat treatment at 250–350° C. for 0.5 to 3 hours, by hydrogenation or dehydrogenation, or both, brought about, for examples, by heating with a platinum, palladium, or nickel hydrogenation catalyst either in the presence or in the absence of hydrogen, by polymerization, and the like.

In place of the maleic acid used in the examples, any alpha-beta unsaturated polybasic acid such as fumaric acid and itaconic acid may be employed. The term, "alpha-beta unsaturated polybasic acid" as used herein and in the appended claims is meant to denote any of these acids including their anhydrides or mixtures thereof. Ordinarily the anhydride form of the acid will be used since it is more reactive than the hydrated form.

The esterification of the rosin may be accomplished with pentaerythritol or with pentaerythritol mixed with any proportion of a polypentaerythritol, 15–75% of the mixture being dipentaerythritol.

Instead of cooking the resin with the oil as described in the examples, a varnish may be prepared by adding a solution of the resin in a suitable volatile organic solvent to the drying oil which may have been previously cooked or blown. It may also be prepared by cold cutting the resin and the oil together by means of a suitable mutual volatile organic solvent.

Furthermore, instead of using a drying oil, a drying-type alkyd-resin may be used. For example, a drying-oil, fatty acid-modified alkyd resin may be cut with the polypentaerythritol resinous ester of the present invention by means of a suitable solvent.

Any desirable additions may be made to the coating compositions of the present invention. Thus, dyes, pigments, other resins, driers and plasticizers may be added. Although the examples have been principally concerned with varnishes, it is to be understood that other coating compositions are equally readily prepared in accordance with this invention. Thus, the mixed pentaerythritol, alpha-beta unsaturated polycarboxylic acid-rosin ester may be used in the preparation of lacquers based on chlorinated rubber, cellulose esters and ethers or other film-forming substances. These lacquers may or may not contain drying oils.

The varnishes in accordance with this invention are particularly useful in the enamel form since they readily wet pigments in the pigment grinding operation.

The advantages of this invention are manifold. In accordance with this invention, it is possible to produce a coating composition which has excellent drying characteristics and which forms a film with excellent water- and alkali-resistant qualities. It is possible to produce such a varnish at a lower cost than had formerly been possible in a varnish of this general type. This low cost is made possible by the fact that, by using the new resin ester, it is possible to utilize soft-drying oils and obtain results as satisfactory as those formerly attainable only by using the more expensive fast-drying oils.

Varnishes produced in accordance with this invention by kettling the maleic pentaerythritol rosin ester with a soft-drying oil are of such a nature that a hard, tack-free film can be produced by subjecting the varnish to a short, low temperature baking cycle.

There are many other advantages of varnishes produced in accordance with this invention. Such varnishes are of sufficient stability to allow storing in cans for protracted periods of time. They will tolerate greater dilution with mineral spirits without separation than will varnishes made with higher maleic anhydride content resins.

With the limited amounts of maleic anhydride present in rosin esterified with pentaerythritol, the percentage of rosin in the resin is high enough that good solubilities are obtained without loss of viscosity. This is, of course, very desirable in a varnish base. Varnishes made therefrom yield a good grinding liquid. Pigmented pastes made therefrom are highly stable to livering. When driers are added to varnishes prepared in accordance with this invention they are less prone to precipitate than when added to other varnishes.

Where in this specification and appended claims the term "acid" is used it is meant to include the anhydride.

Where the terms "soft oil" or "soft-drying oil" are used, it is intended to denote an oil capable of drying completely or partly to a film softer than a corresponding tung oil composition film.

This application is a continuation-in-part of my application for U. S. Letters Patent, Serial No. 389,742, filed April 22, 1941, now U. S. Patent 2,322,197.

What I claim and desire to protect by Letters Patent is:

1. A coating composition comprising a bodied and reacted mixture of a resinous ester of a member of the group consisting of pentaerythritol and mixtures of pentaerythritol and polypentaerythritols with a rosin acid and an amount of maleic acid which is above about 1% but no more than about 9% of the weight of the rosin acid, said acids being substantially completely esterified, and linseed oil.

2. A varnish comprising a bodied and reacted mixture of a resinous ester of a member of the group consisting of pentaerythritol and mixtures of pentaerythritol and polypentaerythritols with a rosin acid and an alpha-beta unsaturated polybasic acid, the amount of the alpha-beta unsaturated polybasic acid being equivalent to an amount of maleic anhydride above about 1% but no more than about 9% of the weight of the rosin acid, said acids being substantially completely esterified, and a drying oil.

3. A varnish comprising a bodied and reacted mixture of a resinous ester of a member of the group consisting of pentaerythritol and mixtures of pentaerythritol and polypentaerythritols with a rosin acid and an alpha-beta unsaturated polybasic acid, the amount of the alpha-beta unsaturated polybasic acid being equivalent to an amount of maleic anhydride above about 1% but no more than about 9% of the weight of the rosin acid, said acids being substantially completely esterified, and a soft-drying oil.

4. A varnish comprising a bodied and reacted mixture of a resinous ester of a member of the group consisting of pentaerythritol and mixtures of pentaerythritol and polypentaerythritols with a rosin acid and an alpha-beta unsaturated polybasic acid, the amount of the alpha-beta unsaturated polybasic acid being equivalent to an amount of maleic anhydride above about 1% but no more than about 9% of the weight of the rosin acid, said acids being substantially completely esterified, and a mixture of tung oil and a soft-drying oil.

5. A varnish comprising a bodied and reacted mixture of a resinous ester of pentaerythritol with a rosin acid and an alpha-beta unsaturated polybasic acid, the amount of the alpha-beta unsaturated polybasic acid being equivalent to an amount of maleic anhydride above about 1% but no more than about 9% of the weight of the rosin acid, said acids being substantially completely esterified, and linseed oil.

6. A varnish comprising a bodied and reacted mixture of a resinous ester of a member of the group consisting of pentaerythritol and mixtures of pentaerythritol and polypentaerythritols with a rosin acid and an amount of maleic acid which, calculated on the anhydride form of the maleic acid, is above about 1% but no more than 9% of the weight of the rosin acid, said acids being substantially completely esterified, and a drying oil.

7. A varnish comprising a bodied and reacted mixture of a resinous ester of a member of the group consisting of pentaerythritol and mixtures of pentaerythritol and polypentaerythritols with a rosin acid and an alpha-beta unsaturated polybasic acid, the amount of the alpha-beta unsaturated polybasic acid being equivalent to an amount of maleic anhydride above about 1% but no more than about 9% of the weight of the rosin acid, said acids being substantially completely esterified, and linseed oil.

8. A varnish comprising a bodied and reacted mixture of a resinous ester of a member of the group consisting of pentaerythritol and mixtures of pentaerythritol and polypentaerythritols with a polymerized rosin acid and an alpha-beta unsaturated polybasic acid, the amount of the alpha-beta unsaturated polybasic acid being equivalent to an amount of maleic anhydride above about 1% but no more than about 9% of the weight of the rosin acid, said acids being substantially completely esterified, and a drying oil.

9. A varnish comprising a bodied and reacted mixture of a resinous ester of a member of the group consisting of pentaerythritol and mixtures of pentaerythritol and polypentaerythritols with a rosin acid and an amount of maleic acid which calculated on the anhydride form of the maleic acid is between about 1% and about 5% of the weight of the rosin acid, said acids being substantially completely esterified, and a drying oil.

10. A process of making a varnish which comprises heating together at between about 250° C. and 320° C. a drying oil and a resinous ester of a member of the group consisting of pentaerythritol and mixtures of pentaerythritol and polypentaerythritols with a rosin acid and an alpha-beta unsaturated polybasic acid, the amount of the alpha-beta unsaturated polybasic acid being equivalent to an amount of maleic anhydride which is above about 1% but no more than about 9% of the weight of the rosin acid, said acids being substantially completely esterified.

11. A process of making a varnish which comprises heating together at between about 250° C. and 320° C. a drying oil and a resinous ester of pentaerythritol with a rosin acid and an alpha-beta unsaturated polybasic acid, the amount of the alpha-beta unsaturated polybasic acid being equivalent to an amount of maleic anhydride which is above about 1% but no more than about 9% of the weight of the rosin acid, said acids being substantially completely esterified.

12. A process of making a varnish which comprises heating together at between about 250° C. and about 320° C. a soft-drying oil and a resinous ester of a member of the group consisting of pentaerythritol and mixtures of pentaerythritol and polypentaerythritols with a rosin acid and an alpha-beta unsaturated polybasic acid, the amount of the alpha-beta unsaturated polybasic acid being equivalent to an amount of maleic anhydride which is above about 1% but no more than about 9% of the weight of the rosin acid, said acids being substantially completely esterified.

13. A process of making a varnish which comprises heating together at between about 250° C. and about 320° C. a mixture of tung oil and a soft-drying oil and a resinous ester of a member of the group consisting of pentaerythritol and mixtures of pentaerythritol and polypentaerythritols with a rosin acid, and an alpha-beta unsaturated polybasic acid, the amount of the alpha-beta unsaturated polybasic acid being equivalent to an amount of maleic anhydride which is above about 1% but no more than about 9% of the weight of the rosin acid, said acids being substantially completely esterified.

14. A process of making a varnish which comprises heating together at between about 250° C. and about 320° C. a bodied, heat-treated drying oil and a resinous ester of a member of the group consisting of pentaerythritol and mixtures of pentaerythritol and polypentaerythritols with a rosin acid and an alpha-beta unsaturated polybasic acid, the amount of the alpha-beta unsaturated polybasic acid being equivalent to an amount of maleic anhydride which is above about 1% but no more than about 9% of the weight of the rosin acid, said acids being substantially completely esterified.

15. A process of making a varnish which comprises heating together at between about 250° C. and about 320° C. linseed oil and a resinous ester of a member of the group consisting of pentaerythritol and mixtures of pentaerythritol and polypentaerythritols with a rosin acid and an alpha-beta unsaturated polybasic acid, the amount of the alpha-beta unsaturated polybasic acid being equivalent to an amount of maleic anhydride which is above about 1% but no more than about 9% of the weight of the rosin acid, said acids being substantially completely esterified.

16. A process of making a varnish which comprises heating together at between about 250° C. and about 320° C. a drying oil and a resinous ester of a member of the group consisting of pentaerythritol and mixtures of pentaerythritol and polypentaerythritols with a rosin acid and an alpha-beta unsaturated polybasic acid, the amount of the alpha-beta unsaturated polybasic acid being equivalent to an amount of maleic anhydride which is above about 1% but no more than about 9% of the weight of the rosin acid, said acids being substantially completely esterified, and the drying oil being of such a viscosity it will require a kettling period of at least 1½ hours at 307° C. to produce a varnish of D viscosity when reduced to 50% nonvolatile material in mineral spirits.

17. A process of making a varnish which comprises heating together at between about 250° C. and about 320° C. a drying oil and a resinous ester of a member of the group consisting of pentaerythritol and mixtures of pentaerythritol and polypentaerythritols with a rosin acid and an alpha-beta unsaturated polybasic acid, the amount of the alpha-beta unsaturated polybasic acid being equivalent to an amount of maleic anhydride between about 1% and about 5% of the weight of the rosin acid, said acids being substantially completely esterified.

18. A process of making a varnish which comprises heating together at between about 250° C. and about 320° C. linseed oil and an ester of pentaerythritol with a rosin acid and maleic acid, the amount of the maleic acid when calculated to the anhydride form being above about 1% but no more than about 9% of the rosin acid by weight, said acids being substantially completely esterified.

FRANK G. OSWALD.

CERTIFICATE OF CORRECTION.

Patent No. 2,347,923.                                        May 2, 1944.

FRANK G. OSWALD.

It is hereby certified that error appears in the printed specification of the above numbered patent requiring correction as follows: Page 4, first column, line 74, claim 5, for the words "linseed oil" read --a drying oil--; and that the said Letters Patent should be read with this correction therein that the same may conform to the record of the case in the Patent Office.

Signed and sealed this 13th day of June, A. D. 1944.

Leslie Frazer (Seal)                                        Acting Commissioner of Patents.